May 30, 1967     D. BURNET ETAL     3,322,587
PROCESS OF BONDING PLYWOOD VENEERS
Original Filed Sept. 1, 1960
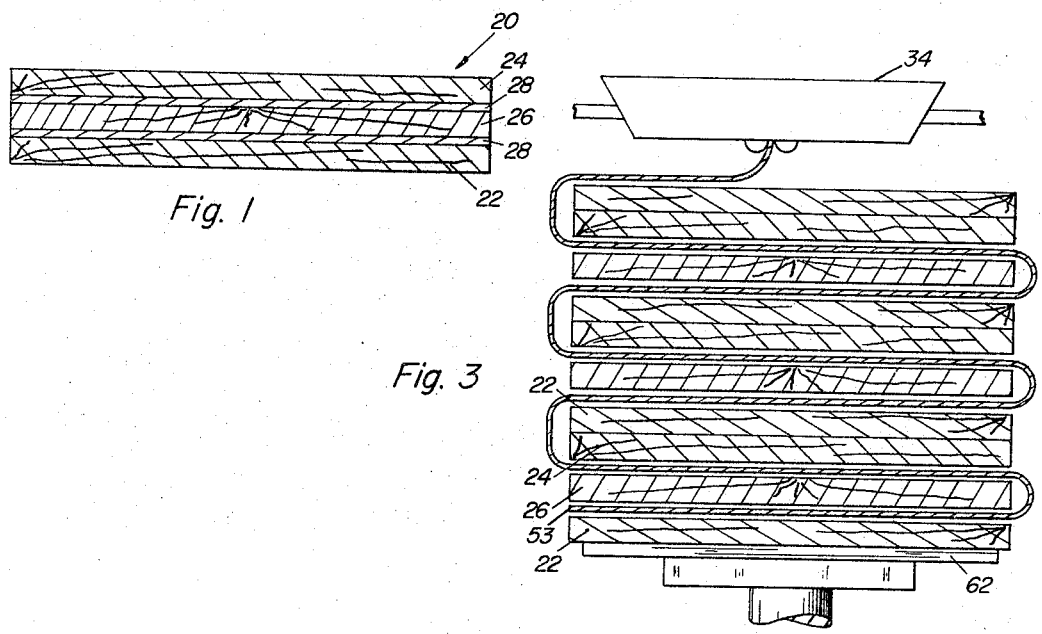
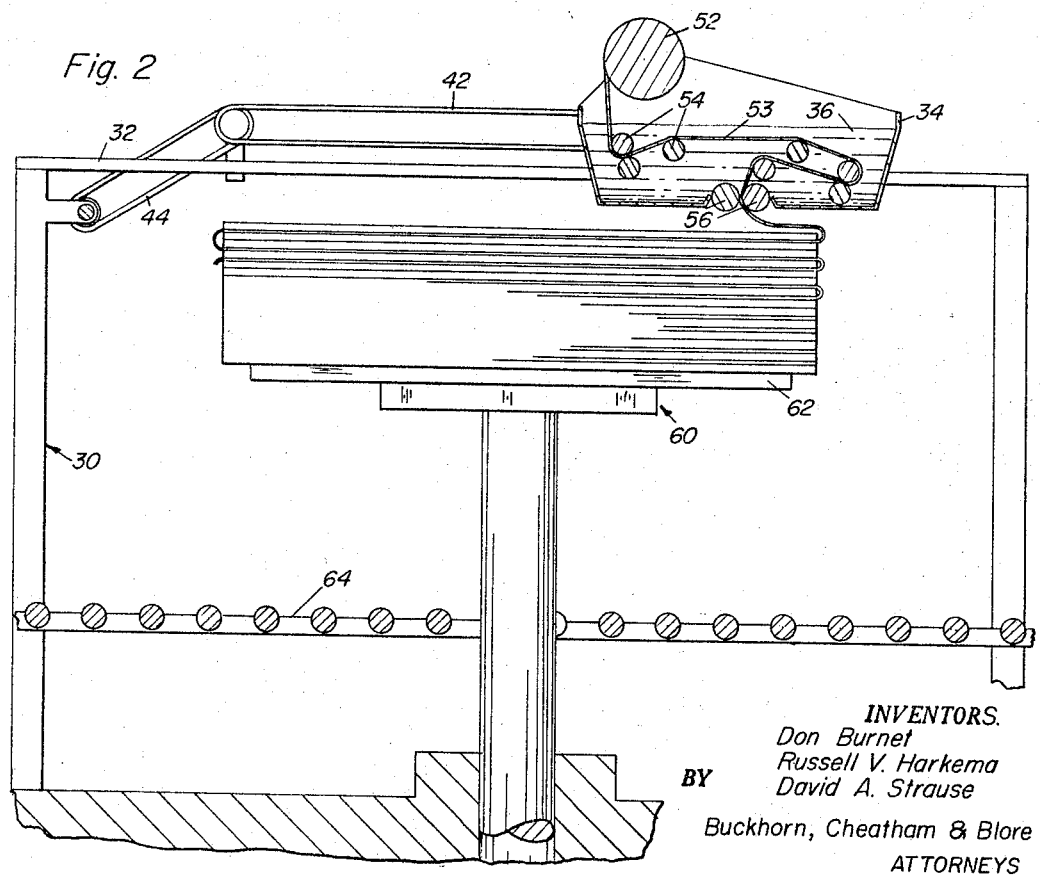
INVENTORS.
Don Burnet
Russell V. Harkema
David A. Strause
BY Buckhorn, Cheatham & Blore
ATTORNEYS May 30, 1967 D. BURNET ET AL 3,322,587
PROCESS OF BONDING PLYWOOD VENEERS
Original Filed Sept. 1, 1960 4 Sheets-Sheet 2
Fig. 4
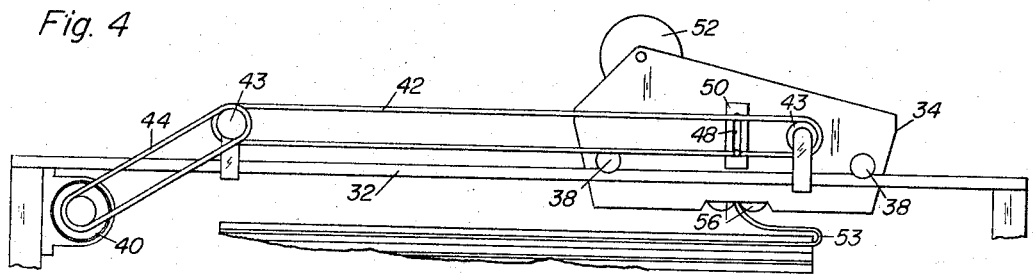
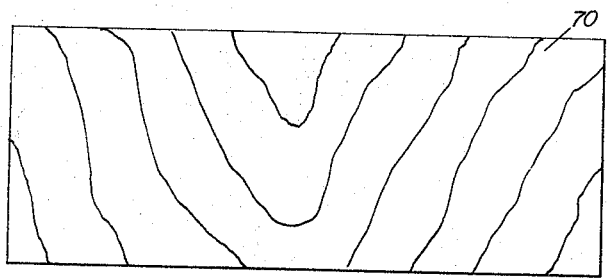
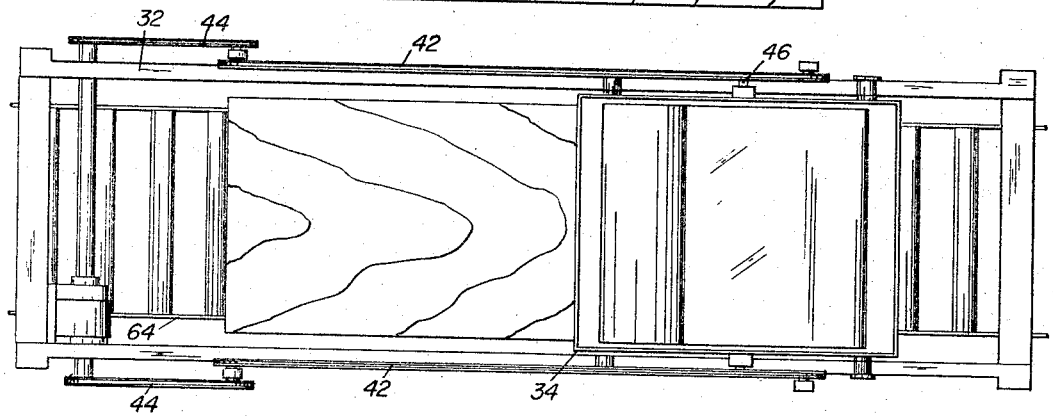
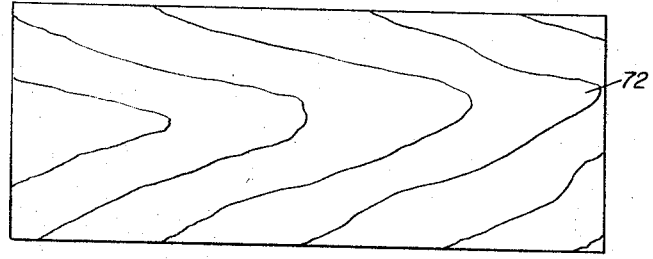
Fig. 5
INVENTORS.
Don Burnet
Russell V. Harkema
BY David A. Strause
Buckhorn, Cheatham & Blore
ATTORNEYS May 30, 1967  D. BURNET ET AL  3,322,587
PROCESS OF BONDING PLYWOOD VENEERS
Original Filed Sept. 1, 1960  4 Sheets-Sheet 3
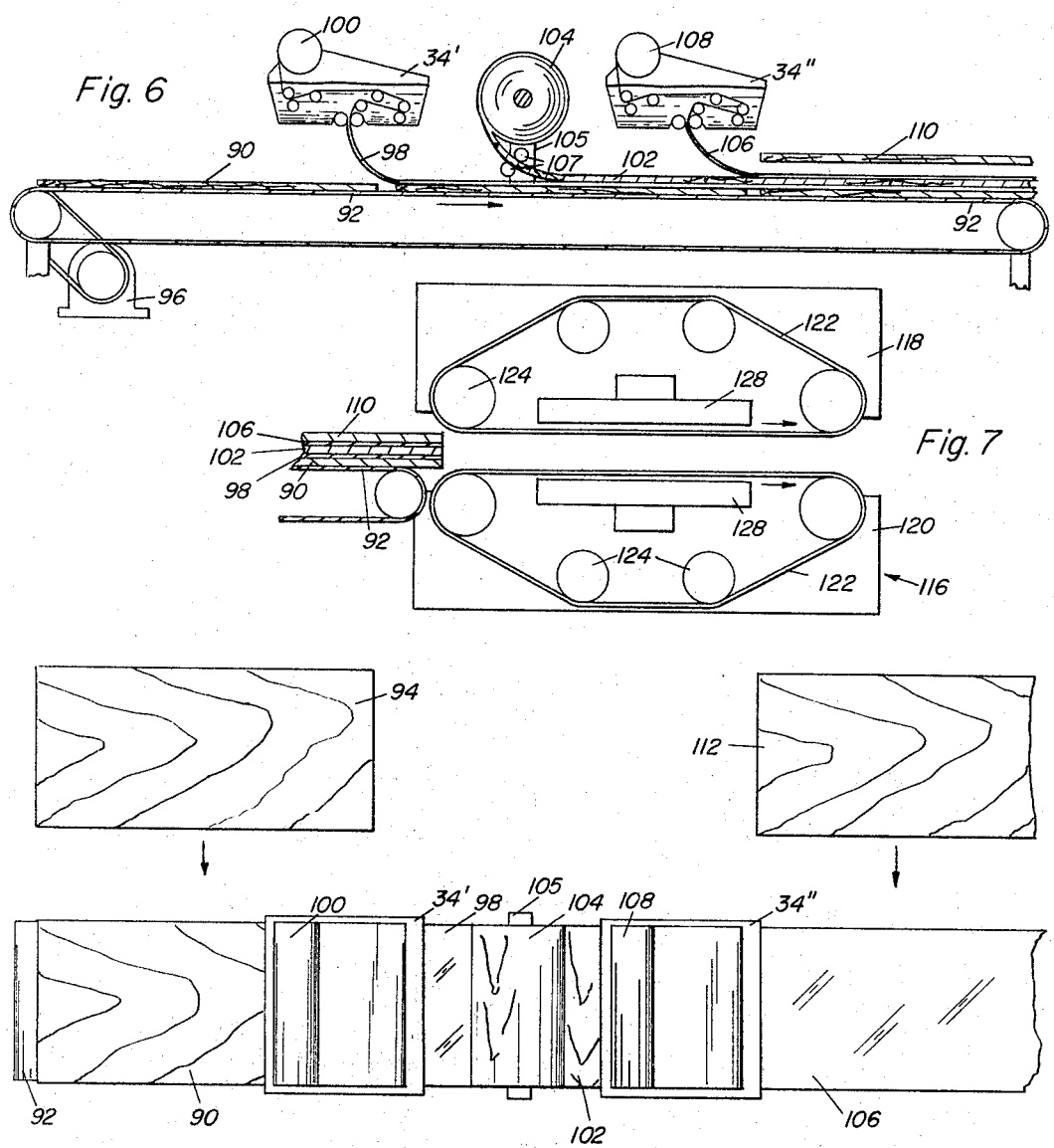
INVENTORS.
Don Burnet
Russell V. Harkema
David A. Strause
BY
Buckhorn, Cheatham & Blore
ATTORNEYS May 30, 1967     D. BURNET ETAL     3,322,587
PROCESS OF BONDING PLYWOOD VENEERS
Original Filed Sept. 1, 1960     4 Sheets-Sheet 4

INVENTORS.
Don Burnet
Russell V. Harkema
BY   David A. Strause

Buckhorn, Cheatham & Blore
ATTORNEYS

United States Patent Office 3,322,587
Patented May 30, 1967

---

3,322,587
PROCESS OF BONDING PLYWOOD VENEERS
Don Burnet, Camas, Wash., Russell V. Harkema, Portland, Oreg., and David A. Strause, Camas, Wash., assignors, by mesne assignments, to Weyerhaeuser Company, Tacoma, Wash., a corporation of Washington
Continuation of application Ser. No. 53,517, Sept. 1, 1960.
This application Mar. 29, 1966, Ser. No. 538,924
11 Claims. (Cl. 156—216)

This is a continuation application of Ser. No. 53,517, filed Sept. 1, 1960, now abandoned.

The present invention relates to the manufacture of laminated woody products and more particularly to the manufacture of plywood.

In the manufacture of plywood by present conventional practice the veneers to be bonded together are assembled by first placing one of the face veneers on a supporting surface. The core veneer or cross-band veneer which will lay on such face veneer is then passed between a pair of adhesive applying rolls which apply a liquid adhesive upon each of the opposite surfaces of the veneer and the core veneer is thereafter placed on the face veneer. The opposite face veneer or other longitudinal grain veneer is next placed on the stack and the lay-up removed to the press or built up further by a similar sequence of steps. This process obviously requires much manual handling of the veneers giving rise to excessive cost. Also the application of adhesive to the veneers is inefficient and wasteful. Because of the irregular surface of the veneers the quantity of adhesive applied is uneven and to assure that a sufficient amount of adhesive is applied to all portions of the surface, the adhesive applying rolls must be adjusted so that the amount of adhesive applied to the thick veneer areas will be sufficient to secure the desired bond and which will cause an excessive amount of adhesive to be applied to the thin veneer areas. If an adequate amount of adhesive is not applied to the thicker area of the veneer, the veneer must be discarded which is, of course, wasteful of both adhesive and veneer.

In an effort to overcome some of these problems, it has been proposed heretofore to utilize dried films of adhesive or dried adhesive-impregnated paper sheets as the bonding medium. These items have not however, proved entirely practicable and have been utilized only to a very limited scale. One of the disadvantages with such dried adhesive media is that again excessive manual handling of the veneer and adhesive sheets is required in the lay-up and of course, the drying, cutting, stacking and other handling of the sheets is costly. Moreover, excessively long pressing times are required along with high pressure and temperature.

It is therefore an object of the present invention to provide new and improved methods of manufacturing plywood.

More particularly it is an object of the present invention to provide a new and improved process for manufacturing plywood which will be economically advantageous.

It is another object of the invention to provide a process for manufacturing plywood which will enable reductions in press time and pressing pressures and temperatures.

A further object is to provide a process which will permit reductions in the amount of adhesive necessary.

Another object is to provide a new and improved process for the "lay-up" of plywood panels in the manufacture of the same.

Still another object is to provide new and improved processes for the "lay-up" of plywood panels that will require a minimum of manual labor.

A still further object is to provide a process of plywood manufacture that will enable close control of the amount of adhesive utilized and give maximum assurance of a uniform spread of adhesive between veneers.

Another object is to provide new and improved apparatus for the lay-up of plywood panels.

Still another object of the invention is to provide new and improved apparatus permitting "continuous" rather than batch type assembly and pressing of plywood panels.

Still other objects and advantages of the present invention will become more apparent hereinafter.

In accordance with the present invention a fibrous web, such as, for example, paper, is impregnated with a liquid adhesive and immediately and while still wet positioned between layers of veneer to be bonded to one another. Semi-automatic apparatus is utilized in the lay-up operation so as to obtain a speedy, economical operation.

For a more complete description of the invention reference is made to the following detailed description thereof and the accompanying drawings wherein:

FIG. 1 is a diagrammatic cross-sectional view of a plywood panel made in accordance with the invention;

FIG. 2 is a sectional view of one embodiment of the apparatus of this invention;

FIG. 3 is a diagrammatic view illustrating the operation of the apparatus of FIG. 2;

FIG. 4 is a fragmentary side view of the apparatus of FIG. 2;

FIG. 5 is a plan view of the apparatus of FIG. 2;

FIG. 6 is a fragmentary side elevation of another embodiment of apparatus constructed in accordance with the invention;

FIG. 7 is a view of other portions of the apparatus associated with that shown in FIG. 6;

FIG. 8 is a plan view of the apparatus shown in FIG. 6;

Figure 9:
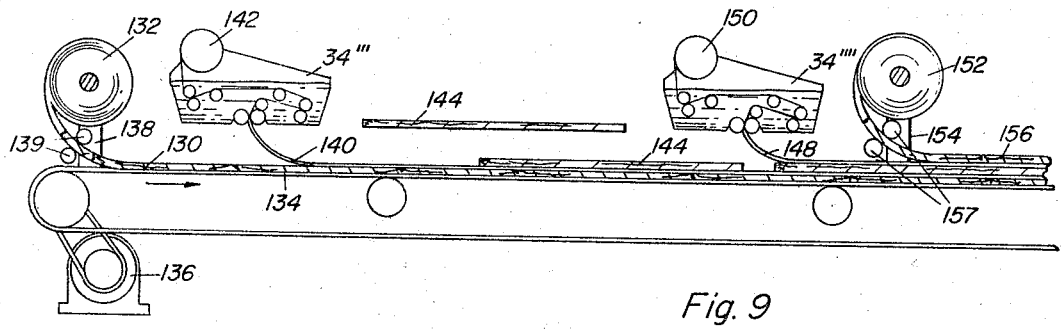
FIG. 9 is a fragmentary side elevation of still another embodiment of apparatus constructed in accordance with the invention.

FIG. 1 is a schematic cross-sectional view of a three-ply plywood panel 20 constructed by the method of the invention comprising opposite face veneers 22, 24 and a core or cross-band veneer 26. Interposed between the core veneer 26 and the corresponding face veneers 22, 24 are fibrous webs 28 which are impregnated with a suitable adhesive so that such adhesive bonds the face veneers to the core veneer. The thickness of the webs 28 is exaggerated for purposes of illustration.

In accordance with the process of the invention panels of woody products such as the panel 20, are manufactured by impregnating an absorbent, fibrous web, such as paper, with a liquid adhesive and substantially immediately and while still wet interposing such web between layers of the woody material to be bonded together. Thereafter heat and pressure as necessary are applied to set the adhesive and firmly bond the layers together.

Suitable semi-automatic apparatus for carrying out the process of the invention is illustrated in FIGS. 2 to 5, inclusive. Such apparatus comprises a frame 30 including a pair of horizontal rails 32 upon which is mounted a tank 34 containing a supply of adhesive 36. The tank is supported on the rails 32 by wheels 38 and means are provided for reciprocating the tank upon the rails. The illustrated means comprises a motor 40 which drives through belts 44 a pair of endless cables 42 mounted on pulleys 43 adjacent the rails 32. The cables 42 are each provided with a lug 46 which engages within a vertically extending slot 48 in brackets 50 mounted on the opposite sides of the tank. As will be evident, driving of the cables 42 will cause the tank to be reciprocated between the pulleys 43.

Mounted on the tank 34 above the level of the adhesive 36 is a roll of paper 52 from which a continuous web 53 is led through the tank around a series of rolls 54 and outwardly through the bottom of the tank between a pair of nip rolls 56 which are adapted to control the amount of adhesive retained by the web as it emerges from the tank.

Positioned beneath the path of the tank 34 is an elevator 60 having a table 62 for supporting a stack of veneers as they are laid up in a manner to be described. The elevator 60 is adapted to be lowered by suitable mechanism (not shown) so that a stack of veneers supported thereon may be transferred to roll casings 64 for transfer to a pressing apparatus.

In the lay-up of panels on the apparatus described a face veneer 22 is positioned on the table 62 with the table positioned immediately below the tank 34 and with the tank at one end of its path. The paper sheet 53 emerging from the tank 34 is positioned as shown in FIG. 3, so that the end thereof will be adjacent one end of the veneer sheet 22 and the motor 40 is started to cause the tank 34 to start its reciprocation. The adhesive impregnated sheet 53 will be deposited across the top of veneer sheet 22 as the tank travels the length of the veneer. Preferably suitable means (not shown) are provided to drive the nip rolls 56 so as to feed the sheet 53 from the tank at the rate it is deposited on the veneer sheets. When the tank 34 reaches the end of its first stroke, a core or cross-band veneer 26 is moved from a stack 70 thereof positioned immediately beside the frame 30 (see FIG. 5) and deposited on top of the adhesive impregnated sheet 53 just laid down on the veneer 22. This transfer of veneer 26 may be done manually or by suitable automatic equipment (not shown). The tank 34 will automatically return across the veneers on the elevator laying down an adhesive-impregnated sheet on the veneer 26. If plywood panels of 3-ply construction are being assembled, a face veneer 24 together with a face veneer 22 are now transferred to the stack on the elevator from a supply 72 of face veneer arranged adjacent the frame 30. If panels of a greater number of plies are being laid up, a single longitudinal grain veneer would be deposited on the elevator stack followed by additional cross-band veneers and longitudinal grain veneers to build up the desired number of layers. The lay-up is continued in sequence as the web 53 is woven back and forth until a desired number of panels has been laid up upon the elevator. The web 53 is then cut beneath the rolls 56 and the elevator 60 is lowered to deposit the stack upon the roll casings 64 and upon which the stack is transferred to another location for pressing in a suitable press (not shown). If the panels are to be separated for insertion into a stack press, the web 53 is simply cut or torn between panels to separate the same.

The fibrous web 53 may comprise any suitable material capable of retaining a sufficient amount of adhesive to attain the desired bond and having sufficient physical strength for the purposes described. Papers such as kraft, sulfite or blends of sulfite and groundwood comprise satisfactory web materials. Preferably a wet-strength resin should be incorporated in the paper during its manufacture in order to enhance its physical strength when it is impregnated with the adhesive. Since the paper provides the weakest link in the glue joint, preferably a minimum amount of paper is used consistent with other requirements. In general, papers of from about 10 to 30 pounds per ream of 3000 square feet basis weight may be used, but preferably the paper is between about 12 and 18 pounds per ream basis weight.

The adhesives which may be used in the practice of the invention are also of broad scope. In general, any liquid adhesive normally employed in plywood manufacture may be used which will impart the desired strength of bond to the finished panels and which has the requisite properties to permit impregnation of a carrier web and reasonable assembly time. A particularly suitable adhesive is a thermosetting phenol-aldehyde water-soluble resin having the following properties:

| | |
|---|---|
| pH | 9.9–10.9 |
| Total non-volatile | 40±1 |
| Viscosity MacMichael (26–d) | 25–30 |
| Specific gravity at 21° C./21° C. | 1.14–1.16 |
| Free formaldehyde | 0 |
| Stage of cure | B |
| Dry rubber at 150° C. _____sec__ | Approx. 20 |
| Gel time at 100° C. _____min__ | Approx. 23 |
| Ash (percent) | 3.1–3.7 |

It has been found that satisfactory bonds may be obtained if the amount of adhesive incorporated into the web is between 5 and 20 pounds of dry solids per one thousand square feet of single glue line (MSGL). When a thermosetting adhesive, such as phenol-aldehyde resin is impregnated into the carrier web, its amount is preferably between about 5 and 10 pounds of dry resin solids per MSGL. The lower limitation is somewhat critical in securing a satisfactory bond. For instance when exterior grade plywood is to be manufactured, at least about 6 pounds of dry resin solids per MSGL should be used. The upper limit is, on the other hand, more or less an economic limit since greater amounts of resin do not provide any improvement in the bond strength attained. These limits may vary somewhat depending on the type of adhesive utilized. While conventional extenders may be added to the adhesive, the carrier web functions as a filler so that the extender can in many instances be eliminated or, at the least, reduced in amount.

Among the surprising and extremely significant advantages that accrue with the use of wet, adhesive-impregnated webs in the lay-up of plywood is that the amount of adhesive may be materially less than is required when dried, adhesive-impregnated sheets are utilized and the press time can be drastically shortened along with reducing the requisite pressing pressures and setting temperature. These facts will be evident from the figures in Table I which show the comparative conditions for producing $5/16$ inch three-ply plywood. The column headed "Wet" shows the conditions for pressing a panel utilizing wet, phenol-formaldehyde impregnated paper between the wood veneers. The column headed "Dry" shows the conditions necessary for producing a panel of comparative quality utilizing a dried, phenol-formaldehyde resin impregnated paper between the wood veneers. The same resins were used in both tests and the paper carriers were the same.

TABLE I

| | Wet | Dry |
|---|---|---|
| Pressing time, min. | 4 | 7 |
| Pressure, p.s.i. | 200 | 220 |
| Temperature, deg. F. | 270 | 300 |
| Amount of resin in paper, pounds resin solids per MSGL. | 6 | 8.5 |

It is believed that it is possible to reduce the pressing time, pressure and temperature when wet, resin impregnated paper is utilized because the wet resin "wets" the veneers more readily and more rapidly than does previously dried resin. Lesser amounts of resin are required when wet resin is used apparently because all of the resin is available for penetration of the veneers and bonding whereas when dried resin films are used some of the resin will cure before it has an opportunity to migrate to the veneers and hence will not be so effective in forming a bond.

When wet, adhesive impregnated webs are utilized, plywood veneers to be bonded therewith preferably have a moisture content of between 2 and 5 percent, the optimum amount being about 3 percent.

Another embodiment of the invention is illustrated in FIGS. 6, 7 and 8 wherein panels are laid up in a continuous manner. In this instance face veneers 90 are fed one by one into end-to-end alignment onto a horizontal conveyor 92 from a suitable supply such as stack 94. The conveyor 92 is driven continuously by suitable means such as a motor 96 to advance veneers in the direction indicated by the arrow in FIG. 6. The veneers 90 are advanced beneath a tank 34' similar to that previously described and in which a continuous sheet of paper 98 drawn from a supply roll 100 is impregnated with a suitable adhesive contained within the tank. The paper sheet 98 is brought into contact with the veneers 90 and continuously laid down upon such veneers as they are fed beneath the tank 34'.

Next a core or cross-band veneer 102 is fed upon the lay-up. Such veneer may be applied as individual sheets but preferably is drawn from a continuous roll 104 of the same arranged so that the veneer 102 will be continuously laid down upon the resin impregnated sheet 98 as the lay-up advances beneath the roll, as indicated in FIG. 6. The roll 104 is suitably journaled on posts 105 and pinch rolls 107 suitably driven or other suitable means are provided for feeding the veneer from the roll 104.

Next in line is another adhesive tank 34" in which another continuous sheet of paper 106 is impregnated with adhesive as it is drawn from a supply roll 108. The impregnated sheet is drawn from the tank and continuously deposited upon the cross-band or core veneer 102. At the next station, face veneers 110 removed from a supply stack 112 are laid upon the assembly in registry with the veneers 90 as they pass beneath. Obviously additional layers of veneer may be laid up in similar manner to the process just described if more than 3-ply plywood is being manufactured.

From the conveyor 92 the panels may be fed by any suitable means to a stack press, but preferably are fed to a continuous press indicated generally at 116 in FIG. 7 and comprising upper and lower sections 118, 120, respectively, which are of similar construction but of reverse position. Each section comprises an endless belt 122 passing about rolls 124. The belts are arranged upon the corresponding section so as to present horizontal flights between which are received the laid up panels from the conveyor 92. Suitable means are provided for driving the belts in the direction indicated. The belts 122 and rollers 124 are arranged to convey the panels through the press 116. A heating platen 128 is provided on each section to heat the panels and exert pressure thereon as they pass between the sections so as to heat the adhesive in the paper webs 98, 106 and cause the same to set. After emerging from the press 116 the panels may be separated by severing the webs 98, 106 and stacked or otherwise handled as desired.

Figure 10:
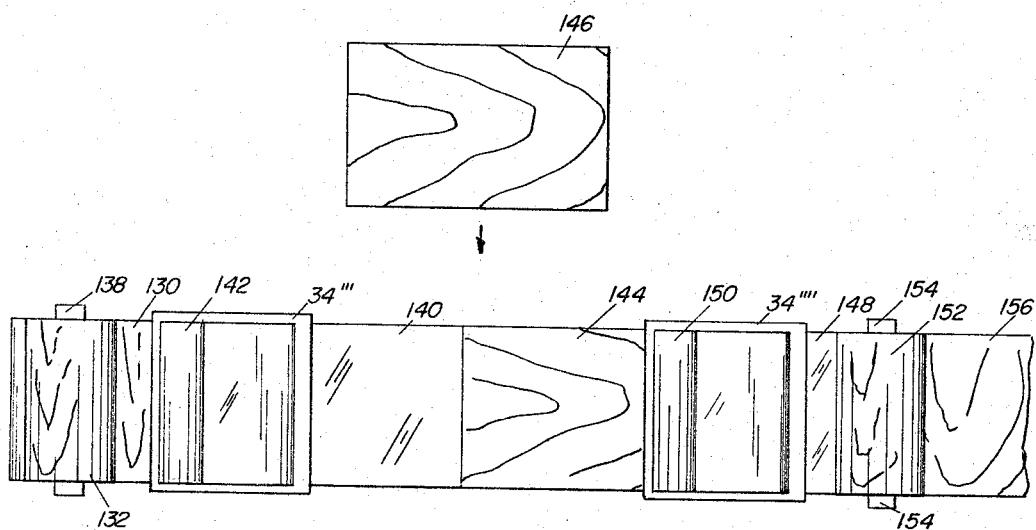
FIG. 10 is a plan view of the apparatus shown in FIG. 9.

In accordance with the embodiment of the invention shown in FIGS. 9 and 10 the opposite face veneers of a panel are drawn from continuous supply webs of the same. Thus a continuous length of face veneer 130 is drawn from a supply roll 132 onto a continuously moving conveyor 134 driven by a motor 136 or other suitable means. The roll 132 may be supported between standards 138 and suitable power driven feed rolls 139 may be provided to feed the veneer from the roll 132 at the desired rate. Fed onto the veneer 130 is an adhesive impregnated paper web 140 drawn from a supply roll 142 through an impregnating tank 34'''. Next a cross-band or core veneer 144 is removed from a supply stack 146 and placed upon the web 140. The assembly then advances beneath a further impregnating tank 34'''' through which another paper web 148 is led from a supply roll 150 and deposited upon the core veneer. Finally the assembly is passed beneath a supply roll 152 of face veneer supported between posts 154 and from which roll a continuous sheet of veneer 156 is fed by suitably driven feed rolls 157 and deposited upon the web 148. The lay-up so obtained may be passed to a continuous press such as described previously or the panels may be separated and placed in a conventional stack press for setting the adhesive.

As is apparent from the foregoing disclosure the processes and apparatus of the invention permit of substantial economies in labor costs in the lay-up of plywood, also since the veneer may be closer to final size, savings in veneer and adhesive spread may also be made.

It will be also apparent that the invention is applicable to the formation of plywood utilizing either interior or exterior type thermosetting adhesives and that the process and apparatus of the invention may be utilized for bonding other types of woody products. For example, hardboard could be bonded to plywood or plywood to other wood composition boards and the like.

Having illustrated certain preferred embodiments of the invention it should be apparent to those skilled in the art that the invention permits of modification in arrangement and detail. We claim as our invention all such modifications as come within the true spirit and scope of the appended claims.

We claim:

1. A method of manufacturing plywood which comprises:
    (a) impregnating an absorbent fibrous sheet with a liquid adhesive,
    (b) placing said impregnated sheet while wet between veneer sheets, and
    (c) treating said assembled sheets to set said adhesive and bond said veneer sheets to one another.

2. The method of claim 1 wherein said fibrous sheet is a continuous web.

3. The method of claim 1 wherein said fibrous sheet is a paper sheet of between 10 to 30 pounds per ream basis weight.

4. The method of claim 1 wherein said adhesive is a thermosetting adhesive.

5. The method of claim 4 wherein said thermosetting adhesive is a thermosetting resin.

6. The method of claim 1 wherein said treating includes applying pressure.

7. The method of claim 4 wherein said treating includes applying heat and pressure.

8. The method of claim 2 wherein said placing is accomplished by overfolding said impregnated web upon itself a plurality of times so as to form a plurality of horizontally disposed layers of said impregnated web and, as said web is overfolded, feeding at least one veneer sheet between adjacent pairs of said layers.

9. The method of claim 2 wherein said placing is accomplished by positioning a first wood veneer sheet with its plane extending horizontally, positioning an end portion of said web over said first veneer sheet, positioning a second veneer sheet over said web end portion, overfolding said web upon said second veneer sheet, and placing a further veneer sheet upon said overfolded web.

10. The method of claim 2 wherein said placing is accomplished by feeding a plurality of wood veneer sheets end-to-end along a horizontal path, feeding said web onto said sheets so that said web is carried along on said sheets, and superimposing a second veneer sheet upon said web in register with each of the sheets thereunderneath.

11. The method of claim 1 wherein said fibrous sheet includes a first and second continuous web, and said placing is accomplished by feeding a first continuous sheet of wood veneer along a predetermined path, feeding a first impregnated continuous fibrous web onto said first sheet of wood veneer, positioning a plurality of wood veneer sheets upon said first web in edge-to-edge relation, said plurality of sheets having a grain extending substantially at right angles to that of said first sheet, feeding said second impregnated continuous fibrous web onto said plurality of sheets, feeding a second continuous sheet of wood veneer onto said second web with said second continuous sheet of wood veneer having a grain extending substantially parallel to the grain of said first continuous sheet.

References Cited

UNITED STATES PATENTS

| | | | |
|---|---|---|---|
| 2,323,105 | 6/1943 | Welch | 156—264 |
| 2,442,422 | 6/1948 | Loetscher | 161—262 |
| 2,699,417 | 1/1955 | Repsher et al. | 161—220 |
| 2,737,227 | 3/1956 | Brummel | 156—213 |
| 2,991,214 | 7/1961 | Burkholder | 156—552 |

FOREIGN PATENTS 510,803  8/1939  Great Britain.

EARL M. BERGERT, *Primary Examiner.*

R. J. ROCHE, *Assistant Examiner.*